US005829840A

United States Patent [19]

Goeckel

[11] Patent Number: 5,829,840

[45] Date of Patent: Nov. 3, 1998

[54] SAFETY SEAT

[75] Inventor: Patrick Goeckel, Cumming, Ga.

[73] Assignee: Patrick Todd Goeckel, Cumming, Ga.

[21] Appl. No.: 801,088

[22] Filed: Feb. 14, 1997

Related U.S. Application Data

[60] Provisional application No. 60/011,740 Feb. 15, 1996.

[51] Int. Cl.[6] .................... B60R 21/00

[52] U.S. Cl. .................... 297/464; 297/465; 297/228.13; 297/217.1; 2/69; 2/456

[58] Field of Search .................... 297/464, 465, 297/485, 228.13, 217.1; 2/69, 456, 457, 458

[56] References Cited

U.S. PATENT DOCUMENTS

| | | |
|---|---|---|
| 1,466,726 | 9/1923 | Meeks . |
| 2,429,050 | 10/1947 | Decker . |
| 3,027,967 | 4/1962 | Silver . |
| 3,516,098 | 6/1970 | O'Link . |
| 3,519,308 | 7/1970 | Kasman et al. . |
| 4,060,280 | 11/1977 | Van Loo . |
| 4,306,748 | 12/1981 | Sullivan . |
| 4,463,465 | 8/1984 | Parker et al. . |
| 4,750,443 | 6/1988 | Blaustein et al. . |
| 5,213,392 | 5/1993 | Bostrom et al. . |
| 5,232,267 | 8/1993 | DeMatteo et al. .................... 297/464 |
| 5,272,779 | 12/1993 | Payton . |
| 5,335,882 | 8/1994 | Bonacci . |
| 5,342,109 | 8/1994 | Berry et al. . |
| 5,421,326 | 6/1995 | Rankin et al. . |
| 5,560,683 | 10/1996 | Penley et al. .................... 297/228.13 |

*Primary Examiner*—Peter M. Cuomo
*Assistant Examiner*—Anthony D. Barfield
*Attorney, Agent, or Firm*—Thomas, Kayden, Horstemeyer & Risley, LLP

[57] ABSTRACT

A safety assembly for a passenger seat in a vehicle such as an airplane is made up of a padded seat cover for fitting over the seat and a safety suit sandwiched between the seat cover and the seat cushions. The seat cover can be opened up by means of a closure member to make the suit accessible to the passenger. The suit is so constructed that the passenger may sit down upon it while donning it. The suit is formed to be adaptable to a wide variation in passenger size, and, when donned, affords flame and smoke protection for the passenger.

28 Claims, 3 Drawing Sheets

SAFETY SEAT

This application claims the benefit of U.S. Provisional Application 60/011,740 filed Feb. 15, 1996.

FIELD OF INVENTION

This invention relates to vehicle seats and, more particular, to a safety seat arrangement for passenger type vehicles.

BACKGROUND OF THE INVENTION

In many types of vehicles, more particularly, passenger vehicles, passenger safety is a paramount consideration. This is especially the case with high speed vehicles such as airplanes or, for example, hovercraft or hydrofoils. For the latter types of vehicles, and for aircraft having over-water routes, Federal regulations mandate that each passenger be provided with a life preserver. However, because of the bulkiness of most types of life preservers, it is difficult, in most passenger compartment configurations, to stow the life preservers where they will be readily accessible to each of the several passengers. Life preservers made of solid flotation material such as, for example, cork, are often stored under each passenger seat, but such a location uses up storage space for the passenger's personal luggage, for example. One space saving remedy is the use of inflatable life preservers, but they have the disadvantage of having to be inflated at some point. As a consequence, such life jackets are generally not permitted in vehicles inasmuch as the step of inflating a jacket can be difficult. Thus, the prior art arrangements are, for the most part, directed to providing life vests or jackets which are easily stored in a minimum of space, are readily accessible to each passenger, and do not require any activating steps, such as inflation, prior to use. Ideally, the only step required should be that of putting the life vest on.

There are numerous patents that are directed to solving the problems of readily accessible yet compactly stored, life preservers, such as life vests and jackets. In U.S. Pat. No. 4,306,748 of Sullivan, there is disclosed a life jacket arrangement stored in the seat of, for example, a water borne vehicle. The seat has a flat backing plate which supports foam material having a cavity formed therein. The life jacket is stored within the cavity and is accessible by the user's lifting the seat cushion up and pulling the jacket forward and out of the cavity. Such an arrangement requires a special seat configuration for creation of the jacket storage space. In addition, the space between the seats fore and aft, is limited and the user must step to one side, such as into the aisle, to provide room for removing the jacket.

In U.S. Pat. No. 5,342,109 of Berry et al., the life jacket storage arrangement comprises a cavity in the seat back and the jacket itself appears to form a portion of the seat back cushion, covered with a flap material having a thin foam backing. Access is achieved by the user lifting the flap and pulling the jacket forward and out. U.S. Pat. No. 5,335,882 of Bonacci also discloses an arrangement where the life vest or jacket forms a part of the seat cushion. In addition to the foregoing patents, U.S. Pat. No. 3,516,098 of O'Link discloses a flotation pad stored in the passenger seat, and U.S. Pat. No. 2,429,050 of Decker shows a compartment in the rear of the seat for hanging clothes. Thus, the use of the passenger seat itself for storage of life preservers and the like is well known in the prior art.

The foregoing patents deal with life preservers for use in water and, thus, have utility in airplanes where the airplane is forced down into a body of water. Such arrangements as shown in the patents have virtually no utility over land, and more importantly, no utility in protecting the passenger from one of the greatest dangers or hazards of all—fire. Fire on an aircraft is an all too prevalent occurrence, whether the airplane is in the air, on the ground, or has crash landed, and there are, apparently, no government regulations and few if any airline arrangements for protecting the individual passengers from the effects of a fire, particularly flame and smoke.

It is unlikely that complete immunity from the effects of fire can ever be provided for individual passengers short of supplying such with a totally fireproof suit upon his or her entering the airplane. Not only would such a procedure be impractical, it would be economically unfeasible, and, further, would create storage problems that would be extremely difficult to solve. Furthermore, the problems presented by the passenger's attempts to don such a suit under emergency conditions would make it virtually impossible for all of the passengers to be protected. With everyone moving out into the aisle of the airplane in an attempt to put the suit on it is questionable whether anyone could expeditiously don the suit.

SUMMARY OF THE INVENTION

The present invention is directed to insuring that each seat occupant in an airplane, for example, is supplied with a fire and heat resistant suit that can be stored in a minimum of space and, more importantly, that the passenger can don while sitting in his seat, thereby obviating the necessity of moving into the aisle to put the suit on.

The invention, in a first illustrative embodiment thereof, comprises a seat cushion arrangement in the form of a seat cover that overlies the standard seat cushions for standard aircraft seats in particular, but also for other types of vehicles, in which the seat cushion portions of the cover are fitted to the vehicle seat and form one continuous member of resilient material, such as foam rubber backed fabric. When fitted to the seat, the cover is substantially held in place thereby. The back rest portion of the cover member overlying the standard seat has first and second cushioned flaps of suitable seat covering material, and overlying the surface of the seat portion of the standard cushion are third and fourth cushioned flaps of suitable seat covering material. By "cushioned" is meant a cushioned backing of foam on the underside of the seat covering material. The first and second flaps and the third and fourth flaps are joined along a line substantially centrally of the seat by one continuous closure member, such as a zipper. Between the top surface of the standard seat and back cushions and the bottom surfaces of the flaps is folded a heat and fire resistant suit, with the legs thereof folded up toward the waist atop the suit and the arms thereof folded across the chest atop the suit. The suit has a head covering or enclosing portion with a fire resistant glass view window. From approximately the neck region of the suit to the crotch thereof extends the closure member. A plurality of tabs of Velcro® or other suitable fastening material are located on the rear of the suit for mating with tabs on the seat cushions to hold the suit in place against slippage and to forestall any tendency of the suit to bunch up when in the storage position. By "Velcro®" is meant the familiar hook and loop arrangement which is well known in the prior art.

In operation, in the event of fire or a signal from the plane crew, the passenger stands up and unzips the flap closures, thereby exposing the suit. The passenger unfolds and unzips the suit and steps into the legs thereof. He or she may then sit down on the suit and pull the head covering or hood over the head and inserts his or her arms into the arms of the suit, after which he or she zips the suit up, thereby becoming completely enclosed in a heat and fire resistant cover. After donning the suit, the passenger stands up, thereby detaching the suit from the cushions. At no time during the operation is it necessary for the passenger to leave the seat area, i.e., step into the aisle. The head covering portion of the suit is equipped with a breathing tube which the passenger inserts in his or her mouth, and which accesses the interior of the suit, preferably through a suitable filter.

In those instances where, for example, the plane has crash landed on water, or in the case of a water borne vehicle, the suit may be supplied with an inflation device, such as a $CO_2$ cartridge arrangement, which can be activated by the passenger after leaving the plane. Alternatively, the seat itself may contain, in addition to the suit, a life vest arrangement of the type shown in several of the aforementioned patents, or the seat cushion itself may be a flotation device that can be removed after the suit is donned. For facilitating the donning of the suit, the closure device, i.e., zipper, on the front of the suit may extend down one leg thereof so that the passenger may place his or her leg on the unzipped leg and then zip the leg up, thus only one leg of the suit is donned by insertion of the passenger's leg therein. It is also contemplated that the other leg may have a closure device also, however, it is likely that the suit will be donned under near panic conditions, hence the simpler the act of donning can be made, the better.

The suit may also be provided with a breathing tube and/or preferably, a filter arrangement to prevent smoke from entering the suit after having been donned and closed up.

In normal situations, the presence of the suit within the seat does not interfere with the passenger's comfort, inasmuch as it, when folded, is quite thin, and the cushions and cushioned flaps conceal and cushion it. On the other hand, it is immediately accessible when the passenger pulls the zipper or other closure device, such as Velcro®, to open the flaps. In addition, at no time is it necessary for the passenger to step into the aisle during donning of the suit, nor is the space between the passenger's eat and the seat in front of the passenger made more crowded as is the case with many of the prior art life jacket arrangements.

In view of the fact that passengers come in all sizes, ideally the suit should be adaptable to fit virtually any sized individual. It would be quite impractical to have different seats equipped with different size suits, thus it is desirable that the suit itself be capable of adjusting to the size of the individual. To this end, the suit, which is made of a material that is highly resistant to both flame and heat, such as Nomex®, is preferably accordion pleated at, for example, certain joints such as the knees and elbows, or, for even more adaptability, the ankles, shoulders, and neck, as well as other places such as the feet and wrists also. Such pleating makes it possible for a person of small stature to have the suit reasonably fit him or her, and also makes it possible for a person of large stature to have a reasonable fit. The accordion pleating has the added advantage of making it possible for an infant or small child to be contained within the suit with an adult, for example.

While accordion pleating is a preferred arrangement, other types of suit contraction and expansion might readily be used. Also, while Nomex® is a preferred material because of its thinness and light weight, other materials such as some polyamide fibers such as Kevlar® may also be used provided the requisite fire and heat resistance is achieved.

Because the suit lies in position on the top of the seat cushion and is covered with a cushioned seat cover, it is not necessary to modify the seats of an aircraft, for example, so long as they are amenable to being covered with the cushioned cover of the invention. It is possible that the seat cushions themselves may be made with recessed center portions in both the seat and the back, as many airplane seats, for example, are. Such recessed portions can serve as "containers" for the suit of the invention, and the cushioned seat cover placed thereover, as is contemplated by the invention.

DETAILED DESCRIPTION

Figure 1:
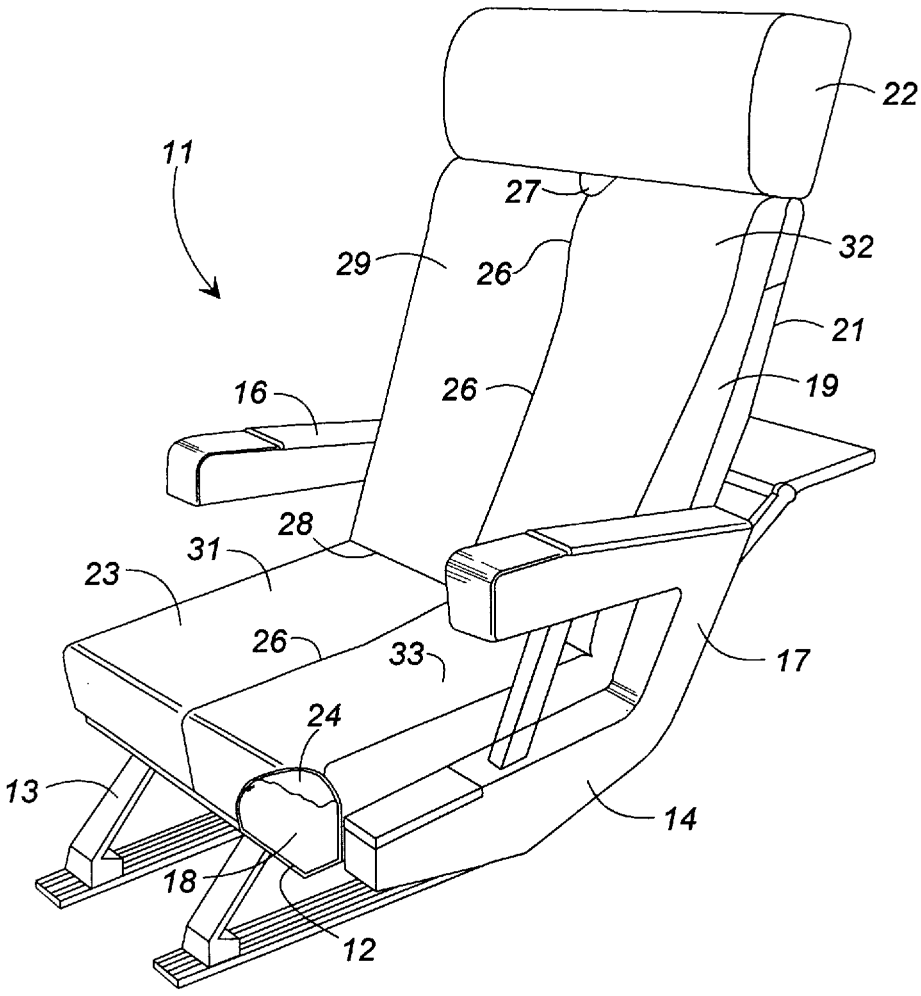
FIG. 1 is a perspective view of an airplane passenger seat, illustrating the appearance of a seat cover of the invention.
Figure 1A:
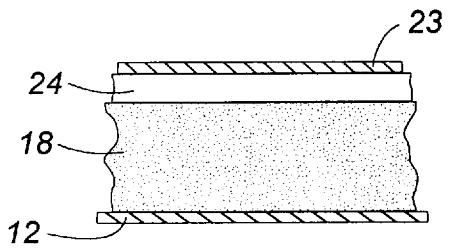
FIG. 1A is a partial view showing the relationship of the seat cover to the seat cushion.

In FIG. 1 there is shown a typical airplane passenger seat 11 which comprises a base 12 supported on one or more legs 13, a side structural member 14 and first and second arm rests 16 and 17. The seat 11 has a seat cushion 18 that rests on and is supported by the base 12, a back cushion 19 that rests against and is supported by a back member 21, and a cushion head rest 22. In accordance with the invention, a fitted seat cover 23 having a cushion backing 24 overlies the cushions 18 and 19 and is fitted thereto, as shown extending across the top and down the sides of the cushions. The material of cover 23 is preferably a cloth fabric that, for aesthetic purposes, may be chosen to match the cloth covering material of cushions 18 and 19, or otherwise chosen to match the general decor of the airplane passenger compartment. Cushioned backing 24 is preferably of a material such as foam rubber that generally is soft and resilient enough to conform readily to irregularities in or on the surface of the cushions 18 and 19, as well as conforming to the transitions from cushion tops to cushion sides. As will be apparent hereinafter, this softness and resiliency is sufficient to allow the placement of a safety suit (not shown) on top of cushions 18 and 19 but beneath cover 23 without causing discomfort to the occupant of the seat.

In accordance with the invention, seat cover 23 has a centrally located opening 26 extending from the top of cushion 19 to the bottom of cushion 18, as shown, which is maintained, when in use, in a closed position by suitable means such as velcro® strips extending therealong, or a zipper, the pull tab 27 for which is shown. To facilitate opening cover 23, a seam 28 at the juncture of cushions 18 and 19 is provided which is preferably held closed by means such as Velcro® strips (not shown) or other suitable quick release means. When opening 26 and seam 28 are opened, the cover 23 is divided into four flaps 29, 31, 32, and 33, as best seen in FIG. 2.

Figure 2:
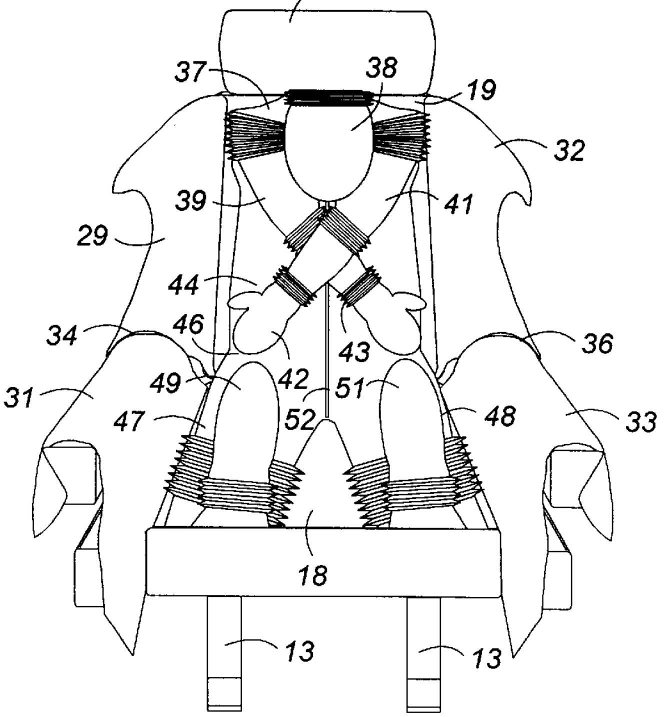
FIG. 2 is a diagrammatic view of the seat of FIG. 1 with the seat cover opened to reveal the safety suit of the invention in its stored position.

In FIG. 2, the flaps 29, 31, 32, and 33 are shown in their open position, and means 34, 36 are shown for joining flaps 29, 31 and flaps 32, 33 together along seam 28. As mentioned heretofore, any suitable means may perform this function, provided such means is of a quick, and relatively effortless, release, such as Velcro® strips.

Folded up, as shown, and resting on cushions 18 and 19, is a safety suit 37 of a heat and fire resistant material having a head portion 38, in folded down position, and arms 39 and 41, shown folded, each of which terminates in a glove member 42. As will the discussed more fully hereinafter, arm 39 is shown as having an accordion pleated wrist section 43. In like manner, arm 41 is likewise so formed. The suit 37 further comprises an upper trunk portion 44 and a lower trunk portion 46 which has first and second legs 47 and 48 depending therefrom, which are shown as being folded up. Legs 47 and 48 terminate, at their distal ends, in foot socks 49 and 51. A suitable closure member 52, such as a zipper or Velcro® strips extends down the front of the suit from the neck portion at least to the crotch in lower truck portion 46, as will be discussed further. The closure member 52 can be made to extend partially or entirely down one or both legs to facilitate the donning of the suit, or separate leg closure members, not shown, may be used.

Inasmuch as it is impractical to have suits of different sizes for different size seat occupants, the suit 37 is desirably adaptable to various sized persons. To this end, in addition to the accordion pleated sections 43 at the wrists, these are accordion pleated sections 53 at the shoulders, sections 54 at the neck, and sections 56 at the knees of the suit. Such pleating allows the various portions of the suit 37 to be stretched or lengthened to the degree necessary to accommodate passengers of large stature. Accordion pleating may also be used at other locations of the suit, or, in the extreme case, the entire suit may be so pleated. It is possible that there may be fire proof materials that are sufficiently elastic that when the suit 37 is made of such a material, it can be stretched to accommodate the larger passenger, in which case the accordion pleating would not be necessary. It is also considered to be feasible, especially where the material of the suit is only slightly elastic, to include the accordion pleating to insure the suit fitting most, if not all, sizes of passengers.

Figure 3:
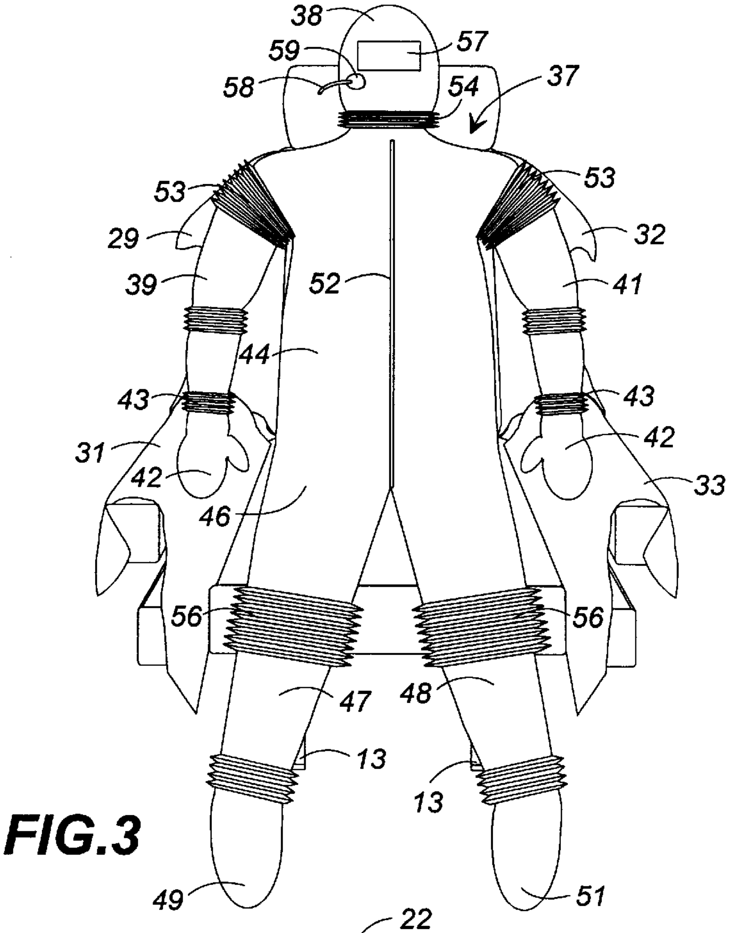
FIG. 3 is a diagrammatic view of the safety suit of the invention in its unfolded state.

The head cover section 38 is equipped with a fire proof transparent window 57 which may be made of any suitable material having the requisite resistance to fire and heat and a high degree of transparency. In addition, the section 38 has a breathing tube 58 and smoke filter 59 which are shown in FIG. 3 in a configuration intended to represent any of a number of possible arrangements. For instance, the tube 58 and smoke filter 59 may take a form similar to the smoke filter arrangement in the mask worn by firemen. Such an arrangement permits both inhaling and exhaling while substantially completely filtering the smoke so that the wearer is not affected thereby.

Figure 5:
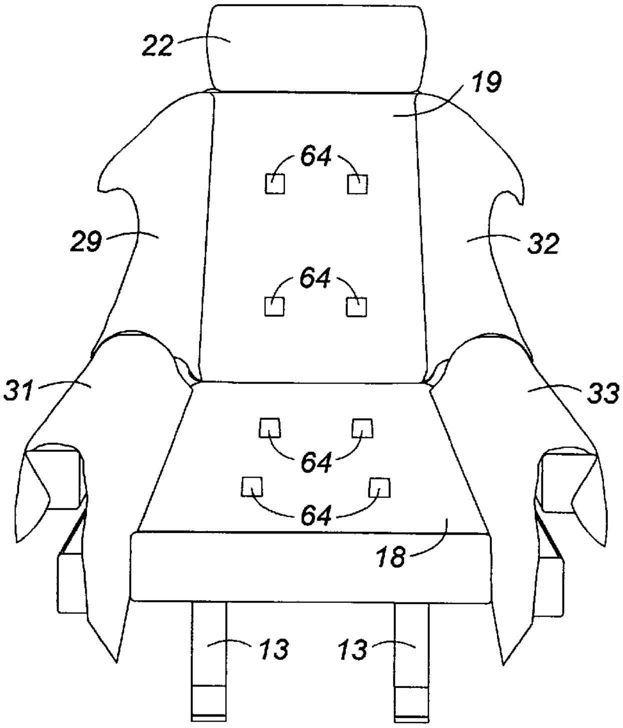
FIG. 5 is a view of the seat showing retention means for the suit of the invention.
Figure 4:
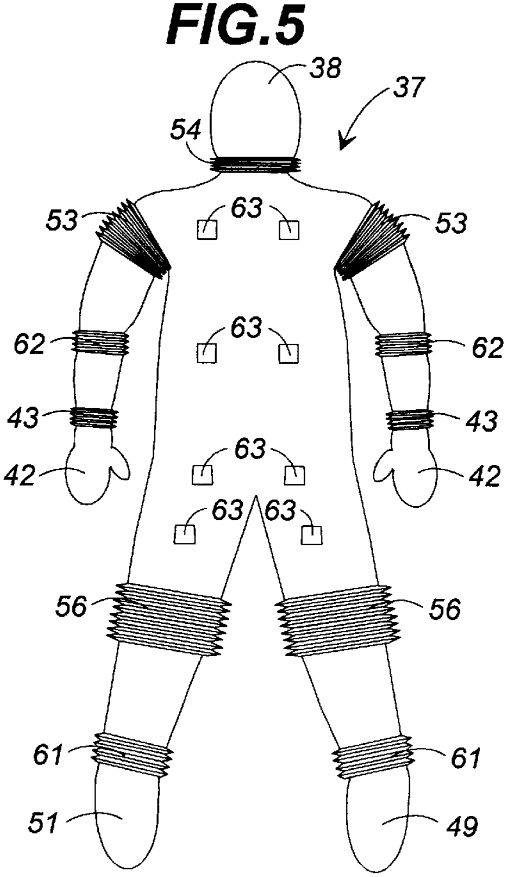
FIG. 4 is an elevation view of the rear of the safety suit of the invention.

In FIG. 4 is shown the rear of the suit 37 depicted in FIG. 3. As can be seen, for illustrative purposes additional pleated sections are shown, i.e., sections 61 at the ankles and sections 62 at the elbows. When the suit 37 is folded and laid in place on the seat cushions 18 and 19, and then covered by the seat cover 23 of the invention, unless otherwise fixed in place, the suit may tend to slide or bunch up as the passenger continually shifts around the seat. To this end, the suit 37 has, on the back thereof, a plurality of Velcro® patches 63 affixed thereto, as shown. These patches 63 are located so as to mate with corresponding patches 64 affixed to cushions 18 and 19, as shown in FIG. 5. When the suit 37 is folded and placed on the cushions 18 and 19, as shown in FIG. 2, the patches 63 and 64 mate and act to prevent the suit 37 from slipping or bunching. These patches 63 and 64 also function to hold the suit in place while it is being donned by the seat occupant. It is possible that other means for holding suit 37 in place might be used, however, Velcro® patches are an extraordinarily simple and effective means for doing so.

In operation, in the event of a fire or a signal from a member of the plane crew, the passenger stands up, faces the seat and opens the closed opening 26 as by unzipping. The passenger then unfolds the suit 37 and, if it is zipped up closed by closure member 52, opens the suit. The passenger then sits down on the suit, inserts his or her legs in the legs 47 and 48, the arms in arms 39 and 41, places the hood or head portion 38 over his or her head, and closes the suit by means of closure member 52. The passenger is then protected from fire and smoke to the extent that any such suit can provide such protection. When the passenger then stands up, the Velcro® patches 63 and 64 separate and the passenger is then free to leave the seat area.

As herein disclosed, the arrangement of slip cover and safety suit of the invention is simple and effective. It is not necessary that the seats of the airplane or other vehicle be modified. To the contrary, the seat cover can be tailored to fit any particular seat configuration. Thus, supplying any existing vehicle with the arrangement of the invention is easily accomplished at minimal cost.

In concluding the detailed description, it should be noted that it will be obvious to those skilled in the art that many variations and modifications may be made to the preferred embodiment without substantially departing from the principles of the present invention. It is intended that all such variations and modifications are to be included herein as being within the scope of the present invention, as set forth in the claims hereinafter. Further, in the following claims, the corresponding structures, materials, acts, and equivalents of all means or step-plus-function elements are intended to include any structure, material, or acts for performing the functions in combination with other claimed elements as specifically recited.

I claim:

1. For use with a vehicle seat having a cushioned seat portion and a cushioned back portion, the seat portion having a front edge, and a back edge adjoining a lower portion of the back portion and the back portion having a top edge, a safety assembly comprising:

a seat cover for covering the cushioned seat and the cushioned back portions of the vehicle seat;

said seat cover comprising first and second flaps for covering the cushioned back portion of the seat and third and fourth flaps for covering the cushioned seat portion of the seat, said first and second flaps and said third and fourth flaps being adapted to be joined together by at least one closure member; and A safety suit adapted to overlie the cushioned seat and cushioned back portions and to be sandwiched between said seat cover and the cushioned seat and cushioned back portions.

2. The safety assembly as claimed in claim 1 wherein said seat cover has first and surfaces and a layer of cushioning material on one of said surfaces adapted to be adjacent to the cushioned seat and cushioned back portions of the seat.

3. The safety assembly as claimed in claim 2 wherein said cushioning material is a foam rubber composition.

4. The safety assembly as claimed in claim 1 wherein said seat cover is adapted to be fitted to the seat and back portions and substantially held in place thereby.

5. The safety assembly as claimed in claim 1 wherein said closure member is a zipper.

6. The safety assembly as claimed in claim 1 wherein said closure member is at least one strip of hook and loop fastening material.

7. The safety assembly as claimed in claim 1 wherein said safety suit is made of fire resistant material.

8. The safety assembly as claimed in claim 7 wherein said fire resistant material is a polyamide fiber material.

9. The safety assembly as claimed in claim 1 wherein said safety suit includes means for adapting said suit to fit seat occupants of a range of sizes.

10. For use with a vehicle seat having a cushioned seat portion and a cushioned back portion, the seat portion having a front edge and a back edge adjoining a lower portion of the back portion and the back portion having a top edge, a safety assembly comprising:

a seat cover for covering the seat and back portions of the vehicle seat;

said seat cover comprising first and second flaps for covering the back portion of the seat and third and fourth flaps for covering the seat portion of the seat, said first and second flaps and said third and fourth flaps being adapted to be joined together by at least one closure member; and a safety suit adapted to be sandwiched between said seat cover and the cushioned seat and back portions;

said safety suit having means for adapting said suit to fit seat occupants of a range of sizes, said means for adapting comprising accordion pleating of the suit material in at least one region thereof.

11. The safety assembly as claimed in claim 10 wherein said safety suit has knee and elbow regions and said means for adapting comprises accordion pleating at the knee and elbow regions thereof.

12. In combination, a vehicle seat and safety assembly therefor, said vehicle seat having a seat cushion and back cushion;

said safety assembly comprising a seat cover for covering at least a portion of at least one of said seat cushions and said back cushion, said seat cover comprising first and second flaps and means for joining said flaps together at their edges;

a safety suit;

said safety suit overlying said seat cushion and positioned between said seat cover and said seat cushion;

said safety suit having a longitudinally extending central opening therein and closure means for closing said opening.

13. The combination as claimed in claim 12 wherein said seat cover includes a layer of cushioning material on the surface thereof adjacent said cushion.

14. The combination as claimed in claim 13 wherein said cushioning material is foam rubber.

15. The combination as claimed in claim 12 wherein said seat cover covers both said seat cushion and at least a portion of said back cushion.

16. The combination as claimed in claim 15 wherein said seat cover comprises third and fourth flaps, and first and second flaps covering at least a portion of said back cushion and said third and fourth flaps covering said seat cushion.

17. The combination as claimed in claim 16 wherein said means for joining comprises means for joining said first and second flaps together and for joining said third and fourth flaps together.

18. The combination as claimed in claim 17 wherein said means for joining comprises strips of hook and loop fastening material.

19. The combination as claimed in claim 16 and further including additional means for joining said first and second flaps to said third and fourth flaps.

20. The combination as claimed in claim 19 wherein said additional means comprises strips of hook and loop fastening material.

21. The combination as claimed in claim 12 wherein said safety suit is made of a heat and fire resistant material.

22. The combination as claimed in claim 21 wherein said material is a polymide fiber material.

23. The combination as claimed in claim 12 wherein said safety suit includes means for adapting said suit to fit seat occupants of a range of sizes.

24. The combination as claimed in claim 12 and further including means on said safety suit for removably securing said safety suit to at least one of the seat and back cushions.

25. The combination as claimed in claim 24 wherein said at least one of said seat and back cushions has securing means thereon for mating with said removably securing means.

26. The combination as claimed in claim 25 wherein said means for removably securing comprises at least one hook and loop patch on said suit and said securing means comprises a hook and loop patch on said at least one cushion positioned to mate with said hook and loop patch on said suit.

27. In combination, a vehicle seat and safety assembly thereof, said vehicle seat having a seat cushion and a back cushion;

said safety assembly comprising a seat cover for covering at least a portion of at least one of said seat cushions and back cushions, said seat cover comprising first and second flaps and means for joining said flaps together at their edges;

a safety suit;

said safety suit overlying said seat cushion and positioned between said seat cover and said seat cushion, said safety suit having a longitudinally extending central opening therein and closure means for closing said opening;

said safety suit further having means for adapting said suit to fit seat occupants of a range of sizes, said means for adapting comprising accordion pleating of the suit in at least one region thereof.

28. The combination as claimed in claim 27 wherein said safety suit has knee and elbow regions and said means for adapting comprises accordion pleating at the knee and elbow regions of said safety suit.

* * * * *